(12) United States Patent
Pyles et al.

(10) Patent No.: US 7,504,054 B2
(45) Date of Patent: *Mar. 17, 2009

(54) METHOD OF TREATING A PLASTIC ARTICLE

(75) Inventors: Robert A. Pyles, Bethel Park, PA (US); Rick L. Archey, Pleasant Hills, PA (US); David M. Derikart, Pittsburgh, PA (US)

(73) Assignee: Bayer MaterialScience LLC, Pittsburgh, PA (US)

(*) Notice: Subject to any disclaimer, the term of this patent is extended or adjusted under 35 U.S.C. 154(b) by 659 days.

This patent is subject to a terminal disclaimer.

(21) Appl. No.: 10/733,657

(22) Filed: Dec. 11, 2003

(65) Prior Publication Data

US 2005/0127570 A1 Jun. 16, 2005

(51) Int. Cl.
*B05D 1/18* (2006.01)
*B05D 1/38* (2006.01)
*G02C 7/02* (2006.01)

(52) U.S. Cl. ............ 264/2.6; 264/2.7; 427/164; 427/158

(58) Field of Classification Search ............ 264/340, 264/1.32, 1.34, 1.7, 1.9, 2.6, 2.7; 8/506; 427/164, 158
See application file for complete search history.

(56) References Cited

U.S. PATENT DOCUMENTS

| | | | |
|---|---|---|---|
| 3,043,709 A | 7/1962 | Amborski | 117/7 |
| 3,045,315 A * | 7/1962 | Dusenbury | 28/246 |
| 3,297,462 A | 1/1967 | Fanning | 117/33.3 |
| 3,309,220 A | 3/1967 | Osteen | 117/33.3 |
| 3,382,183 A | 5/1968 | Donolan et al. | 252/300 |
| 3,519,462 A | 7/1970 | Bristol et al. | 117/33.3 |
| 3,617,330 A | 11/1971 | Peilstocker | 117/33.3 |
| 3,892,889 A | 7/1975 | Cohnen et al. | 427/160 |

(Continued)

FOREIGN PATENT DOCUMENTS

EP 1 213 320 A1 6/2002

(Continued)

*Primary Examiner*—Matthew J. Daniels
(74) *Attorney, Agent, or Firm*—Noland J. Cheung; John E. Mrozinski, Jr.

(57) ABSTRACT

In the method of the present invention at least a portion of the surface of a plastic article (e.g., a molded article of thermoplastic polycarbonate) is contacted with (e.g., immersed in) a treatment composition which includes one or more performance additives. The treatment composition contains: (i) at least one performance additive (e.g., an ultraviolet light absorber); (ii) water; (iii) at least one carrier represented by the following general formula I,

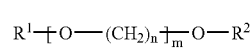

wherein $R^1$ is a radical selected from the group consisting of linear or branched $C_1$-$C_{18}$ alkyl, benzyl, benzoyl and phenyl, $R^2$ is a radical selected from the group consisting of linear or branched $C_1$-$C_{18}$ alkyl, benzyl, benzoyl, phenyl and H, n is 2, 3 or 4, and m is 1 to 35; and (iv) a diol selected from at least one of linear or branched $C_2$-$C_{20}$ aliphatic diols, poly($C_2$-$C_4$ alkylene glycol), cycloaliphatic diols having from 5 to 8 carbon atoms in the cyclic ring, monocyclic aromatic diols, bisphenols and hydrogenated bisphenols. In an embodiment of the present invention, the carrier is ethyleneglycol monobutyl ether, and the diol is diethylene glycol.

25 Claims, 1 Drawing Sheet

U.S. PATENT DOCUMENTS

| | | | | |
|---|---|---|---|---|
| 4,126,660 | A | 11/1978 | Lempkowicz et al. | 264/101 |
| 4,146,658 | A | 3/1979 | Humphrey | 427/160 |
| 4,284,729 | A | 8/1981 | Cross et al. | 521/158 |
| 4,320,939 | A * | 3/1982 | Mueller | 351/44 |
| 4,323,597 | A | 4/1982 | Olson | 427/160 |
| 4,349,607 | A | 9/1982 | Ching | 428/412 |
| 4,390,676 | A | 6/1983 | Loshaek | 526/313 |
| 4,481,314 | A * | 11/1984 | Rule | 524/88 |
| 4,535,104 | A | 8/1985 | Pyles | 524/91 |
| 4,589,884 | A | 5/1986 | Gilpatrick | 8/481 |
| 4,640,690 | A | 2/1987 | Baumgartner et al. | 8/506 |
| 4,792,465 | A | 12/1988 | Silbermann et al. | 427/160 |
| 4,798,427 | A | 1/1989 | Sear | 350/1.1 |
| 4,812,141 | A | 3/1989 | Baumgartner et al. | 8/506 |
| 4,977,029 | A * | 12/1990 | Brown et al. | 428/429 |
| 5,015,523 | A * | 5/1991 | Kawashima et al. | 428/336 |
| 5,321,441 | A | 6/1994 | Osterlund | 351/44 |
| 5,756,010 | A | 5/1998 | Appell et al. | 252/589 |
| 5,846,607 | A * | 12/1998 | Hurley et al. | 427/374.2 |
| 5,851,585 | A | 12/1998 | Gupta et al. | 427/162 |
| 5,914,193 | A * | 6/1999 | Ono et al. | 428/451 |
| 6,242,065 | B1 | 6/2001 | Blomberg et al. | 428/64.1 |
| 6,433,043 | B1 | 8/2002 | Misura et al. | 523/456 |
| 6,448,304 | B1 | 9/2002 | Kosaka et al. | 523/106 |
| 6,506,864 | B1 * | 1/2003 | Daughenbaugh et al. | 526/314 |
| 6,602,447 | B2 | 8/2003 | Danielson et al. | 252/589 |
| 6,733,543 | B2 | 5/2004 | Pyles et al. | 8/506 |
| 6,749,646 | B2 | 6/2004 | Pyles et al. | 8/506 |
| 6,949,127 | B2 * | 9/2005 | Pyles et al. | 8/506 |
| 6,994,735 | B2 * | 2/2006 | Pyles et al. | 8/609 |
| 2001/0038494 | A1 | 11/2001 | Blomberg et al. | 359/642 |

FOREIGN PATENT DOCUMENTS

| | | |
|---|---|---|
| JP | 04-057977 | 2/1992 |
| WO | 00/14325 | 3/2000 |
| WO | 02/44258 A2 | 6/2002 |
| WO | 03/083207 A1 | 10/2003 |
| WO | WO 03/083207 * | 10/2003 |

* cited by examiner

METHOD OF TREATING A PLASTIC ARTICLE

FIELD OF THE INVENTION

The present invention relates to a method of treating a plastic article. At least a portion of the surface of the plastic article (e.g., a molded article of thermoplastic polycarbonate) is contacted with a treatment composition which includes water, at least one carrier (e.g., ethyleneglycol mono-butyl ether), a diol (e.g., diethylene glycol), and at least one additive (e.g., an ultraviolet (UV) stabilizer). While in contact with the treatment composition, the additive imbibes (diffuses or penetrates) into the plastic article, and a treated plastic article is formed having improved physical properties, such as improved UV resistance.

BACKGROUND OF THE INVENTION

Treated plastic articles (e.g., containing performance enhancing additives) can be prepared by means of incorporating (e.g., by means of compounding) additives directly into the polymeric materials from which the articles are prepared. Such direct (or bulk) incorporation methods result in the additive being dispersed substantially throughout the bulk of the plastic article.

Performance enhancing additives, such as UV stabilizers (absorbers), are typically expensive, and as such minimizing the amount incorporated into the plastic article while at the same time maintaining a sufficient level of performance is desirable. Direct incorporation methods are not particularly well suited with regard to minimizing the amount of performance enhancing additive used, as it is distributed throughout the whole of the plastic article. With direct incorporation methods, reducing the amount of performance enhancing additive throughout the bulk of the plastic article results in an equivalent reduction at the surface thereof, where it is typically most needed due to interactions of the surface with the environment (e.g., with light, oxygen, and/or the interior surfaces of a mold). As a result, physical properties of the plastic article are typically sacrificed if the amount of performance enhancing additive is too far reduced in a direct incorporation method.

The preparation of treated plastic articles by applying a treatment composition to the surface of the plastic article is generally known. Because the additives are incorporated primarily into the surface of the plastic article, such surface treatment methods are better suited with regard to minimizing the amount of performance enhancing additive used while at the same time maintaining a sufficient level of performance. Typically, the treatment compositions that are applied to the surface of the plastic article are non-aqueous.

In light of environmental concerns related to the use of organic solvents, more recently there has been increased emphasis towards the development of treatment methods that make use of aqueous treatment compositions. Methods of treating plastic articles by means of aqueous treatment compositions typically suffer from disadvantages that include, for example, non-uniform and/or inadequate treatment of the article, and an inconsistent degree of treatment/resulting physical properties between different batches of the same plastic articles.

U.S. Pat. No. 4,535,104 discloses a thermoplastic aromatic copolyestercarbonate article that is surface impregnated with a specific class of UV light degradation inhibiting compound. The '104 patent discloses dipping the thermoplastic copolyestercarbonate article into a non-aqueous solution of butoxy ethanol and UV stabilizer heated to a temperature of 125° C., followed by drying of the article at 150° C.

U.S. Pat. No. 4,323,597 discloses a method of preparing a ultraviolet radiation stabilized polymeric article (e.g., of polycarbonate) by applying to the surface thereof a composition containing ultraviolet radiation absorber and a non-aggressive liquid carrier. The '597 patent discloses examples of non-aggressive liquid carriers as including hydroxy ethers, alcohols, alcohol-water mixtures, liquid hydrocarbons and chlorofluorocarbons.

It would be desirable to develop new methods of treating plastic articles that make use of aqueous treatment compositions, and that result in the formation of uniformly and sufficiently treated articles. In addition, it would be desirable that such new methods also provide consistent degrees of treatment over time.

SUMMARY OF THE INVENTION

In accordance with the present invention, there is provided a method of treating a plastic article comprising:
(a) providing a plastic article comprising at least one polymer selected from thermoplastic polymer and thermoset polymer;
(b) contacting at least a portion of the surface of said plastic article with a treatment composition comprising,
 (i) at least one additive selected from UV stabilizers, optical brighteners, mold release agents, antistatic agents, thermal stabilizers, IR absorbers and antimicrobial agents,
 (ii) water,
 (iii) at least one carrier represented by the following general formula I,

wherein $R^1$ is a radical selected from the group consisting of linear or branched $C_1$-$C_{18}$ alkyl, benzyl, benzoyl and phenyl,
 $R^2$ is a radical selected from the group consisting of linear or branched $C_1$-$C_{18}$ alkyl, benzyl, benzoyl, phenyl and H,
 n is 2, 3 or 4, and
 m is 1 to 35, and
 (iv) a diol selected from at least one of linear or branched $C_2$-$C_{20}$ aliphatic diols, poly($C_2$-$C_4$ alkylene glycol), cycloaliphatic diols having from 5 to 8 carbon atoms in the cyclic ring, monocyclic aromatic diols, bisphenols and hydrogenated bisphenols;
(c) maintaining said portion of said plastic article in contact with said treatment composition for a period of time at least sufficient to form a treated plastic article; and
(d) removing said treated plastic article from contact with said treatment composition.

DETAILED DESCRIPTION OF THE INVENTION

Figure 1:
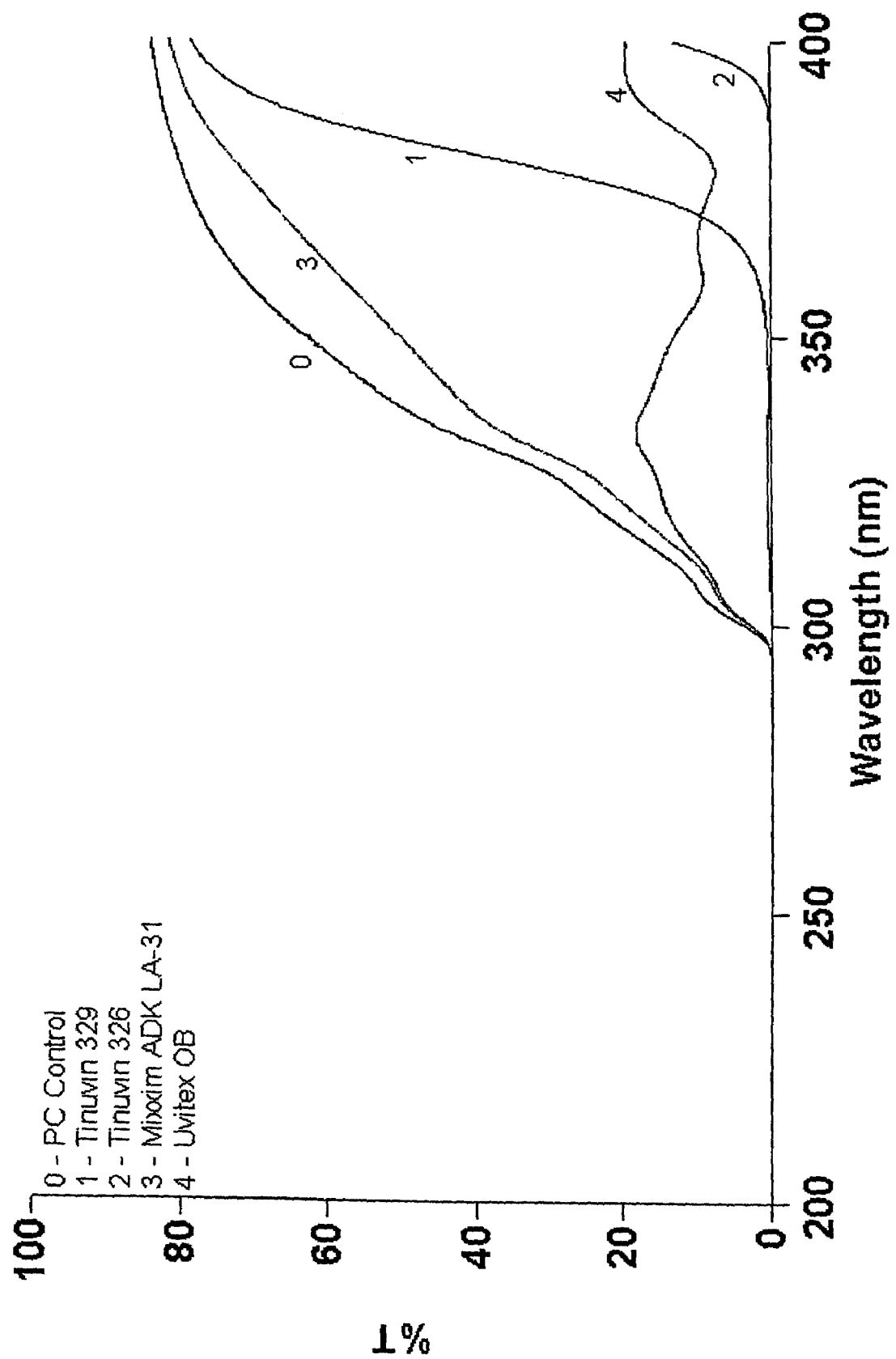
FIG. 1 is a graphical representation of a plot of percent light transmission (% T) of treated and non-treated plastic articles as a function of wavelength.

The treatment composition (or bath) used in the method of the present invention includes at least one carrier according to formula I, as described previously herein. With the carrier represented by formula I, while $R^2$ may be a hydrogen radical (group), $R^1$ may not be a hydrogen radical. Linear or branched alkyls from which $R^1$ and $R^2$ of formula I may each be independently selected include, but are not limited to, methyl, ethyl, propyl, butyl, pentyl, hexyl, heptyl, octyl, nonyl, decyl, undecyl, dodecyl, tridecyl, tetradecyl, pentadecyl, hexadecyl, heptadecyl and octadecyl, and structural isomers thereof (e.g., iso-propyl, i-butyl, t-butyl, etc.).

With further reference to formula I, $R^1$ and $R^2$ may each also be independently selected from benzyl, benzoyl and phenyl groups, each of which may independently and optionally be substituted with 1 to 5 groups selected from halo groups (e.g., chloro, bromo and fluoro), linear or branched $C_1$-$C_9$ alkyl groups (e.g., methyl, ethyl, propyl, butyl, pentyl, hexyl, heptyl, octyl and nonyl,), and aromatic groups (e.g., phenyl).

In an embodiment of the present invention, regarding formula I, n is 2, $R^1$ is selected from n-butyl, i-butyl and t-butyl, and $R^2$ is hydrogen (H). In a particularly preferred embodiment of the present invention, n is 2, m is 1, $R^1$ is n-butyl, and $R^2$ is H.

The carrier may be selected from poly($C_2$-$C_4$ alkoxylated) phenols and/or poly($C_2$-$C_4$ alkoxylated) $C_1$-$C_9$ alkyl substituted phenols. Examples of poly($C_2$-$C_4$ alkoxylated) phenols include ethoxylated, propoxylated and/or butoxylated phenol. Examples of poly($C_2$-$C_4$ alkoxylated) $C_1$-$C_9$ alkyl substituted phenols, include, octylphenoxypolyethyleneoxyethanol and poly(oxy-1,2-ethanediyl), alpha-phenyl-omegahydroxy, styrenated.

The carrier is typically present in the treatment composition in an amount of less than or equal to 30 percent by weight, preferably less than or equal to 25 percent by weight, and more preferably less than or equal to 20 percent by weight. The carrier is also typically present in the treatment composition in an amount of at least 10 percent by weight, preferably at least 15 percent by weight, and more preferably at least 17 percent by weight. The carrier may be present in the treatment composition in an amount ranging between any combination of these upper and lower values, inclusive of the values thereof. For example, the carrier may be present in the treatment composition in an amount typically from 10 to 30 percent by weight, more typically from 15 to 25 percent by weight, and further typically in an amount of from 17 to 20 percent by weight. The percent weights being based on the total weight of the treatment composition, in each case.

The treatment composition also further includes a diol selected from at least one of linear or branched $C_2$-$C_{20}$ aliphatic diols, poly($C_2$-$C_4$ alkylene glycol), cycloaliphatic diols having from 5 to 8 carbon atoms in the cyclic ring, monocyclic aromatic diols, bisphenols and hydrogenated bisphenols. Examples of linear or branched $C_2$-$C_{20}$ aliphatic diols include, but are not limited to, ethylene glycol, propylene glycol, 1,3-propane diol, 1,2- and 2,3-butane diol, pentane diols, hexane diols, heptane diols, octane diols, nonane diols, decane diols, undecane diols, dodecane diols, tridecane diols, tetradecane diols, pentadecane diols, hexadecane diols, heptadecane diols, octadecane diols, nonadecane diols and icosane diols.

Examples of poly($C_2$-$C_4$)alkylene glycols from which the diol (iv) may be selected include, but are not limited to, di-, tri-, tetra-, penta- and higher ethylene glycols, di-, tri-, tetra-, penta- and higher propylene glycols, and di-, tri-, tetra-, penta- and higher butylene glycols. Cycloaliphatic diols having from 5 to 8 carbon atoms that may be used as diol (iv) include, but are not limited to, cyclopentane diol, cyclohexane diol, cyclohexane dimethanol, cycloheptane diol and cyclooctane diol. Examples of monocyclic aromatic diols that may be used as diol (iv) include but are not limited to, benzene diol, e.g., 1,2-dihydroxy benzene and 1,3-dihydroxy benzene; $C_1$-$C_4$ alkyl substituted benzene diol, e.g., 4-tert-butyl-benzene-1,2-diol, 4-methyl-benzene-1,2-diol, 3-tert-butyl-5-methyl-benzene-1,2-diol and 3,4,5,6-tetramethyl-benzene-1,2-diol; halo substituted benzene diol, e.g., 3,5-dichlorobenzene-1,2-diol, 3,4,5,6-tetrabromo-benzene-1,2-diol and 3,4,5-trichloro-benzene-1,2-diol; and $C_1$-$C_4$ alkyl and halo substituted benzene diol, e.g., 3-bromo-5-tert-butyl-benzene-1,2-diol, 3,6-dichloro-4-methyl-benzene-1,2-diol, 3,-bromo-4,5-dimethyl-benzene-1,2-diol and 3-chloro-4,6-di-tert-butyl-benzene-1,2-diol.

Bisphenols and hydrogenated bisphenols that may be used as diol (iv) may be represented by the following general formula II,

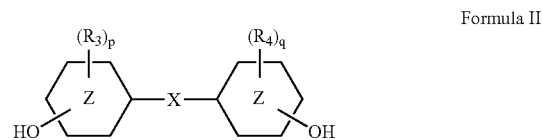

Formula II

In formula II: $R_3$ and $R_4$ are each selected independently from each other and independently for each p and q from $C_1$-$C_4$ alkyl (e.g., methyl, ethyl, n-propyl, iso-propyl, n-butyl, sec-butyl and tert-butyl), chlorine and bromine; p and q are each independently an integer from 0 to 4; and —X— is a divalent linking group selected from —O—, —S—, —S($O_2$)—, —C(O)—, —$CH_2$—, —CH=CH—, —C($CH_3$)$_2$—, and —C($CH_3$)($C_6H_5$)—; and

represents a benzene ring or a cyclohexane ring. An example of a bisphenol that may be used as diol (iv) is 4,4'-isopropylidenebisphenol (i.e., bisphenol A). An example of a hydrogenated bisphenol that may be used as diol (iv) is 4,4'-isopropylidenebiscyclohexanol.

In a preferred embodiment of the present invention, diol (iv) is a poly($C_2$-$C_4$ alkylene glycol) selected from diethylene glycol, triethylene glycol, tetraethylene glycol, pentaethylene glycol and mixtures thereof. Particularly preferred diols are ethylene glycol and diethylene glycol.

The diol is typically present in the treatment composition in an amount of less than or equal to 20 percent by weight, preferably less than or equal to 15 percent by weight, and more preferably less than or equal to 12 percent by weight. The diol is also typically present in the treatment composition in an amount of at least 5 percent by weight, preferably at least 7 percent by weight, and more preferably at least 10 percent by weight. The diol may be present in the treatment composition in an amount ranging between any combination of these upper and lower values, inclusive of the values thereof. For example, the diol may be present in the treatment composition in an amount typically from 5 to 20 percent by weight, more typically from 7 to 15 percent by weight, and further typically in an amount of from 10 to 12 percent by weight. The percent weights being based on the total weight of the treatment composition, in each case.

Water is typically present in the treatment composition in an amount of less than or equal to 90 percent by weight, preferably less than or equal to 85 percent by weight, and more preferably less than or equal to 75 percent by weight. Water is also typically present in the treatment composition in an amount of at least 50 or 51 percent by weight, preferably at least 60 percent by weight, and more preferably at least 65 percent by weight. Water may be present in the treatment composition in an amount ranging between any combination of these upper and lower values, inclusive of the values thereof. For example, water may be present in the treatment composition in an amount typically from 50 or 51 to 90 percent by weight, more typically from 60 to 85 percent by weight, and further typically in an amount of from 65 to 75 percent by weight. The percent weights being based on the total weight of the treatment composition, in each case. The water used is preferably deionized and/or distilled water.

The treatment composition also includes at least one performance enhancing additive selected, for example, from at least one of UV stabilizers, optical brighteners, mold release agents, antistatic agents, thermal stabilizers, IR absorbers and antimicrobial agents (compounds or substances). The performance enhancing additives may be selected from those that are known for use in preparing thermoplastic and thermoset molded plastic articles.

Classes of UV (ultraviolet) stabilizers (or absorbers) that may be used in the treatment composition of the present invention include, but are not limited to salicylic acid UV absorbers, benzophenone UV absorbers, benzotriazole UV absorbers, cyanoacrylate UV absorbers, and mixtures thereof. More specific examples of benzotriazole UV absorbers include but are not limited to: 2-(2'-hydroxy-5'methylphenyl)-benzotriazole (commercially available as Tinuvin® P from Ciba, Tarrytown, N.Y.); 2-(3'-5'-di-tert-butyl-2'-hydroxyphenyl)-5-chlorobenzotriazole (commercially available as Tinuvin® 327 from Ciba); 2(2'-hydroxy-3'-5'-di-tert-amylphenyl)benzotriazole (commercially available as Tinuvin® 328 from Ciba); benzenepropanoic acid, 3-(2H-benzotriazol-2-yl)-5-(1,1-dimethyl ethyl)-4-hydroxy-, $C_{7-9}$ branched alkyl esters (commercially available as Tinuvin® 384 from Ciba); 2-(3',5'-bis(1-methyl-1-phenylethyl)-2'-hydroxyphenyl)benzotriazole (commercially available as Tinuvin® 900 from Ciba); 2-[2-hydroxy-3-dimethylbenzylphenyl-5-(1,1,3,3-tetramethylbutyl)]-2H-benzo triazole (commercially available as Tinuvin® 928; a mixture of poly (oxy-1,2-ethanediyl), α-[3-[3-(2H-benzotriazol-2-yl)-5-(1, 1-dimethylethyl)-4-hydroxyphenyl]-1-oxopropyl]-omega-hydroxy and poly(oxy-1,2-ethanediyl), α-[3-[3-(2H-benzotriazol-2-yl)-5-(1,1-dimethylethyl)-4-hydroxyphenyl]-1-oxopropyl]-omega-[3-[3-(2H-benzotriazol-2-yl)-5-(1,1-dimethylethyl)-4-hydroxyphenyl]-1-oxopropyl]- (commercially available as Tinuvin® 1130 from Ciba); and 2-[4-[2-hydroxy-3-tridecyl oxypropyl]oxy]-2-hydroxyphenyl]-4,6-bis(2,4-dimethylphenyl)-1,3,5-triazine and 2-[4-[2-hydroxy-3-dodecyl oxypropyl]oxy]-2-hydroxyphenyl]-4,6-bis(2,4-dimethylphenyl)-1,3,5-triazine (commercially available as Tinuvin® 400 from Ciba). An example of a commercially available benzophenone UV stabilizer is 2-hydroxy-4-(N-octoxy) benzophenone (commercially available as Lowilite® 22 from Great Lakes Chemical Corp. of West Lafayette, Ind.).

Further examples of commercially available UV stabilizers that may be use in the present invention include, but are not limited to: p-methoxycinnamic acid 2-ethylhexyl ester stabilized with butylated hydroxy toluene (hereinafter "BHT") (commercially available as Uvinul MC 80 from BASF of Mount Olive, N.J.); p-methoxycinnamic acid 2-ethylhexyl ester unstabilized (commercially available as Uvinul MC 80 N from BASF); 2-cyano-3,3-diphenylacrylic acid 2'-ethylhexyl ester (commercially available as Uvinul 539 T from BASF); 2-hydroxy-4-(N-octoxy) benzophenone (commercially available as Cyasorb UV-501 from Cytec of West Paterson, N.J.); 2-(2'-hydroxy-3'-5'-di-t-amylphenyl) benzotriazole (commercially available as Cyasorb UV-2337 from Cytec); and 2-(2-hydroxy-5-t-octylphenyl) benzotriazole (commercially available as Cyasorb UV-5411 PA from Cytec).

A further class of UV stabilizers that may be used in the method of the present invention include those modified with at least one poly(oxyalkylene) chain. Such poly(oxyalkylene) chain modified UV stabilizers are characterized in having low migratory properties once imbibed (or diffused) into the plastic article (e.g., they are not easily leached out of the plastic article into which they have been imbibed). The poly(oxyalkylene) chain may be a homopolymer, copolymer or block-copolymer formed from the reaction of $C_2$-20 alkyelene oxides (e.g., ethylene oxide, propylene oxide and butylene oxide). The poly(oxyalkylene) group may be terminated with a hydroxyl group, a $C_1$-$C_{20}$ alkyl ether group, or a $C_1$-$C_{20}$ ester group. Poly(oxyalkylene) chain modified UV stabilizers are described, for example, in further detail in U.S. Pat. No. 6,602,447 B2.

Optical brighteners that may be included in the treatment composition in the method of the present invention typically absorb a light wavelength of 450 nm or less and emit the light at a higher wavelength, such as a wavelength of 550 nm or less, preferably 525 nm or less. It is preferred that the emitted light be in the blue region of the visible spectrum (e.g., emitted light having a wavelength of at least about 400 nm and up to about 525 nm. Most preferably, the light emitted is no more than about 500 nm.

Classes of optical brighteners that may be used in the present invention include, but are not limited to benzoxazole derivatives and stilbene derivatives. Examples of commercially available benzoxazole derivatives that may be used in the present invention include, but are not limited to:

2,2'-(2,5-thiophenediyl) bis [5-tert-butylbenzoxazole] (commercially available as Uvitex® OB from Ciba); benzoxazole derivatives such as Blankophor® KLA (from Bayer of Pittsburgh, Pa.); Hostalux® KCB (from Clariant of Muttenz, Switzerland); and Hostalux® KCU (from Clariant). An example of a commercially available stilbene derivative is 4,4'-bis(2-benzoxazolyl) stilbene (commercially available as Eastobrite® OB-1 from Eastman of Kingsport, Term.). Further classes of optical brighteners that may be used in the present invention include, but are not limited to: derivatives of 4,4'-diminostilbene-2-2'-disulfonic acid; coumarin derivatives (e.g., 4-methyl-7-diethylaminocoumarin); and bis-(styryl) biphenyls.

Classes of mold release agents that may be included in the treatment composition include, but are not limited to hydrocarbon-based mold release agents, fatty acid-based release agents, fatty acid amide-based mold release agents, alcohol-based mold release agents, fatty acid ester-based mold release agents, silicone-based mold release agents, and mixtures or combinations thereof. Mold release agents are typically more advantageously included in the treatment composition when the plastic article is selected from thermoplastic pellets and/or thermoplastic strands, from which a molded article would later be prepared, as will be discussed further herein. Examples of hydrocarbon-based mold release agents include, synthetic paraffins, polyethylene waxes and fluorocarbons. Fatty acid-based release agents that may be used include, for example, stearic acid and hydroxystearic acid. Fatty acid amide-based mold release agents that may be used include, for example, stearic acid amide, ethylenebisstearoamide and alkylenebisfatty acid amides. Examples of alcohol-based mold release agents include, stearyl alcohol, cetyl alcohol, and polyhydric alcohols such as polyglycols and polyglycerols. An example of a fatty acid ester-based mold release agent that may be included in the dye bath is butyl stearate.

Antistatic agents that may be included in the treatment composition in the method of the present invention include, but are not limited to non-ionic antistatic agents, such as those containing fluorocarbon groups, and silicone oils, such as BAYSILONE O1 A (commercially available from Bayer AG, Germany). Further examples of antistatic agents that may be used in the present invention include, distearylhydroxylamine, triphenyl amine, tri-n-octylphosphine oxide, triphenyl phosphine oxide, pyridine N-oxide and ethoxylated sorbitan monolaurate.

Classes of thermal (or heat-resistant) stabilizers that may be included in the treatment composition of the method of the present invention include, but are not limited to, phenol stabilizers, organic thioether stabilizers, organic phosphide stabilizers, hindered amine stabilizers, epoxy stabilizers and mixtures thereof. Specific examples of thermal stabilizers include, but are not limited to, 2,6-di-t-butyl-p-cresol, o-t-butyl-p-cresol, tetrakis-(methylene-3-(3,5-di-t-butyl-4-hydroxyphenyl)-propionate)methane, β-naphtylamine, p-phenylenediamine, and thiodiethylene bis(3,5-di-tert-butyl)-4-hydroxyhydrocinnamate, which is commercially available from Ciba Specialty Chemical under the tradename IRGANOX 1035 thermal stabilizer.

Infra red (IR) absorbers that may be used in the method of the invention include dyes that absorb in the IR region of the spectrum. Examples of commercially available IR absorbers include, CYASORB IR-99, IR-126 and IR-165, which are available from Glendale Protective Technologies, Inc., Lakeland, Fla.

Antimicrobial agents that may be included in the treatment composition of the present invention include, for example, substances having antimicrobial activity towards microorganisms, such as pathogenic microorganisms. The term "antimicrobial agents" as used herein and in the claims is also inclusive of antiseptic, disinfectant and antifungal substances. In addition, the antimicrobial agents may also be used in a pre-activated form, e.g., in a form that does not become antimicrobially active until the occurrence of a triggering event, such as action of a microbe on the pre-activated substance.

Examples of antimicrobial agents that may be included in the treatment composition include, but are not limited to: quinolones, such as nalidixic acid, pipemidic acid, cinoxacin, ciprofloxacin, norfloxacin, ofloxacin, pefloxacin and enoxacin; aminoglycosides, such as gentamycin, kanamycin, amikacin, sisomycin, tobramycin and netilmicin; macrolides, such as erythromycin, clarithromycin and azithromycin; polypeptides, such as bacitracin, mupirocin, thyrothricin, gramicidin and tyrocidin; lincomycins, such as lincomycin and clindamycin; and antimycobacterial agents, such as rifampicin and fusidic acid. Further examples of antimicrobial agents that may be used in the treatment composition include: 10,10'-oxybisphenoxy arsine; 2-n-octyl-4-isothiazolin-3-one; 2,4,4'-trichloro-2'-hydroxy diphenyl ether (also named 5-chloro-2-(2,4-dichlorophenoxy)-phenol, and commonly referred to as Triclosan); N-butyl-1,2-benzisothiazolin-3-one; and N-(trichloromethylthio)phthalamide.

The amount of performance additive present in the treatment composition may vary widely. Typically the performance additive is present in the treatment composition in an amount sufficient to result in the formation of a treated plastic article having improved physical properties, e.g., improved ultraviolet light resistance.

The amount of performance additive that is actually present in the treatment composition will depend on the solubility of the performance additive within the mixture of water, carrier and diol. The solubility of the performance additive within the treatment composition will also be affected by the temperature of the composition. In those instances where the performance additive is not fully soluble in the composition, the treatment composition is deemed to contain a saturated level of performance additive. By adding an amount of performance additive that is in excess of the saturation level of additive in the composition (e.g., by placing additive in a bag filter through which the treatment composition is continually passed) the level of performance additive in the composition can be maintained at the saturation level during treatment operations. The level (e.g., the saturation level) of performance additive in the composition may be determined periodically or continuously by, for example, thermogravimetric analysis or spectrophotometric analysis.

The performance enhancing additives are typically present in the treatment composition in a positive amount totaling less than or equal to 15 percent by weight, more typically less than or equal to 10 percent by weight, preferably less than or equal to 5 percent by weight, and more preferably less than or equal to 1 percent by weight. The performance enhancing additives are also typically present in the treatment composition in an amount totaling at least 0.001 percent by weight, preferably at least 0.005 percent by weight, and more preferably at least 0.01 percent by weight. The performance enhancing additives may be present in the treatment composition in a total amount ranging between any combination of these upper and lower values, inclusive of the recited values thereof. For example, the performance enhancing additives may be present in the treatment composition in an amount typically totaling from 0.001 to 15 percent by weight, more typically from 0.005 to 5 percent by weight, and further typically in an amount of from 0.01 to 1 percent by weight. The percent weights being based on the total weight of the treatment composition, in each case.

In an embodiment of the present invention, the treatment composition may optionally further include a surfactant (or emulsifier), which is different from each of the carrier and the diol. Suitable surfactants in the present invention are readily dispersible upon being poured into water, and then form a milky emulsion upon agitation thereof. The surfactant may be selected from at least one of: anionic surfactants; amphoteric surfactants; and a non-ionic surfactants selected from at least one poly($C_2$-$C_4$ alkoxylated) $C_{14}$-$C_{18}$ unsaturated fatty acids.

Examples of anionic surfactants that may be used in the present invention include, for example, amine salts or alkali salts of carboxylic, sulfamic or phosphoric acids, for example sodium lauryl sulfate, ammonium lauryl sulfate, lignosulfonic acid salts, ethylene diamine tetra acetic acid (EDTA) sodium salts and acid salts of amines such as laurylamine hydrochloride or poly(oxy-1,2-ethanediyl),alpha.-sulfo-omega-hydroxy ether with phenol 1-(methylphenyl)ethyl derivative ammonium salts.

Amphoteric surfactants that may be present in the dye bath include, for example: lauryl sulfobetaine; dihydroxy ethylalkyl betaine; amido betaine based on coconut acids; disodium N-lauryl amino propionate; or the sodium salts of dicarboxylic acid coconut derivatives.

Examples of poly($C_2$-$C_4$ alkoxylated) $C_{14}$-$C_{18}$ unsaturated fatty acids include, ethoxylated, propoxylated and/or butoxylated tetradecenyl carboxylic acid.

The optional surfactant (emulsifier) may be used in an amount less than or equal to 5 percent by weight. Preferably the optional surfactant is present in the treatment composition in an amount of 0.5 to 5 percent by weight, and more preferably in an amount of 3 to 4 percent by weight. The percent weights, in each case, being based on the weight of the treatment composition.

The method of the present invention involves treating a plastic article. The plastic article may comprise at least one polymer selected from thermoplastic and/or thermoset polymers. In an embodiment of the present invention, the plastic article comprises a polymer selected from at least one of (co)polyesters, (co)polycarbonates, polyesterpolycarbonate copolymers, acrylonitrile-butadiene-styrene (ABS) copolymers, polyamides, polyurethanes, polyalkyl(meth)acrylate (e.g., polymethylmethacrylate) and styrene copolymers (e.g., styrene acrylonitrile copolymers). The (co)polyesters, (co)polycarbonates, polyesterpolycarbonate copolymers may be aliphatic or aromatic polymers (e.g., containing residues of bisphenol A). These recited polymers may be thermoplastic polymers, thermoset polymers or a combination thereof, as the case may be.

As used herein and in the claims, the term "thermoplastic polymer" and similar terms means a polymer that has a softening or melting point, and is substantially free of a three dimensional crosslinked network resulting from the formation of covalent bonds between chemically reactive groups, e.g., active hydrogen groups and free isocyanate groups. Thermoplastic polymers that may be used in the present invention include those known to the skilled artisan, such as thermoplastic (co)polyesters, thermoplastic (co)polycarbonates, thermoplastic polyesterpolycarbonate copolymers, thermoplastic acrylonitrile-butadiene-styrene (ABS) copolymers, thermoplastic polyamides, thermoplastic polyurethanes, thermoplastic polyalkyl(meth)acrylate and thermoplastic styrene copolymers.

As used herein and in the claims the term "thermoset polymer" and similar terms means polymers having a three dimensional crosslinked network resulting from the formation of covalent bonds between chemically reactive groups (e.g., active hydrogen groups and free isocyanate groups or oxirane groups; or between unsaturated groups, such as allyl groups). Thermoset polymers typically do not have a melting point. Thermoset polymers that may be used in the present invention include those known to the skilled artisan, such as thermoset (co)polyesters, thermoset (co)polycarbonates, thermoset polyesterpolycarbonate copolymers, thermoset polyamides, thermoset polyurethanes, and thermoset polyalkyl(meth)acrylate.

Preferred thermoset polymers include thermoset polycarbonates. A preferred thermoset polycarbonate is a polymerizate of a polymerizable composition comprising polyol(allyl carbonate) monomers, e.g., CR-39 diethyleneglycol bis(allyl carbonate) monomer available commercially from PPG Industries, Inc.

The plastic article may contain additives that are known to the skilled artisan. Such additives include, but are not limited to: dyes (such as static and/or photochromic dyes); mold release agents; fillers; reinforcing agents in the form of fibers or flakes (e.g., metal flakes such as aluminum flakes); flame retardant agents; pigments; and opacifying agents, such as titanium dioxide; light-diffusing agents, such as polytetrafluoroethylene, zinc oxide, Paraloid EXL-5136 available from Rohm and Haas and crosslinked polymethylmethacrylate microspheres (such as n-licrospheres from Nagase America); UV-stabilizers; hydrolytic stabilizers; thermal stabilizers; and antimicrobial agents (e.g., including those antimicrobial agents recited previously herein with regard to the treatment composition). In an embodiment, the plastic article contains at least one of static dyes, photochromic dyes, pigments, crosslinked polymethylmethacrylate microspheres, glass microspheres and metal flakes.

If the plastic article contains dyes (e.g., static and/or photochromic dyes), the dyes may be incorporated into the plastic article by means of compounding the dyes with the plastic material from which the plastic article is prepared (i.e., by direct incorporation methods). Alternatively or in addition thereto, the dyes may imbibed (diffused or infused) into the surface of the plastic article by means of contacting a composition comprising at least one dye with the surface of the plastic article.

As used herein and in the claims, the term "static dyes" means a dye that does not substantially change color upon exposure to (or being shaded from) ultraviolet (UV) light. The term "photochromic dyes" as used herein and the claims means dyes (or substances) that reversibly change color upon exposure to UV light, as is known to the skilled artisan. Typically, upon exposure to a particular wavelength of UV light, a photochromic dye will be converted into an open or activated form which is colored (within a particular portion of the visible spectrum). Upon removal of the UV light source, the open/activated photochromic dye returns to a closed/inactivated form which is not colored, or which is at least less colored than the activated form.

Static dyes that may be present in the plastic article include, for example, fabric dyes and disperse dyes as well as dyes that are known in the art as being suitable for tinting plastic articles, such as thermoplastic polycarbonate articles. Examples of suitable disperse dyes include, but are not limited to, Disperse Blue #3, Disperse Blue #14, Disperse Yellow #3, Disperse Red #13 and Disperse Red #17. The classification and designation of the static dyes are recited herein in accordance with "The Colour Index", $3^{rd}$ edition published jointly by the Society of Dyes and Colors and the American Association of Textile Chemists and Colorists (1971), which is incorporated herein by reference. Dyestuffs can generally be used either as a sole dye constituent or as a component of a dye mixture depending upon the color desired. Thus, the term static dye as used herein includes mixtures of static dyes.

The static dye class known as "Solvent Dyes" may be present in the plastic article. Solvent dye examples include, but are not limited to, Solvent Blue 35, Solvent Green 3 and Acridine Orange Base. However, it has been observed that Solvent Dyes, typically do not color (tint/dye) the plastic article as intensely as do Disperse Dyes (which have been described previously herein), when imbibed into the surface of the plastic article.

Further suitable static dyes include, for example, water-insoluble azo, diphenylamine and anthraquinone compounds. Especially suitable examples include acetate dyes, dispersed acetate dyes, dispersion dyes and dispersol dyes, such as are disclosed in Colour Index, $3^{rd}$ edition, vol. 2, The Society of Dyers and Colourists, 1971, pp. 2479 and pp. 2187-2743, respectively all incorporated herein by reference. Preferred dispersed dyes include Dystar's Palanil Blue E-R150 (anthraquinone/Disperse Blue) and DIANIX Orange E-3RN (azo dye/Cl Disperse Orange 25).

Another class of suitable static dyes include non-migratory static dyes (i.e., static dyes that have been chemically modified to minimize or eliminate their migration out of plastic articles into which they have been incorporated). A particular class of non-migratory static dyes may be represented by the following formula IV, $$R_5\text{-(polymeric constituent-Y)}_t \qquad \text{IV}$$

In formula IV: $R_5$ represents an organic dyestuff radical (or chromophore radical); the polymeric constituent is selected independently for each (t) from homopolymers, copolymers and block-copolymers of poly($C_2$-$C_4$ alkylene oxides), e.g., homopolymers of polyethylene oxide and polypropylene oxide, poly(ethylene oxide-propylene oxide) copolymers, and di- or higher block copolymers of ethylene oxide and propylene oxide; (t) may be an integer from 1 to 6; and (Y) is selected independently for each (t) from hydroxyl, primary amine, secondary amine and thiol groups. The polymeric constituent may have a molecular weight of from, for example, 44 to 1500. Dyestuff radicals from which (Y) may be selected include, but are not limited to, nitroso, nitro, azo (e.g., monoazo, diazo and triazo), diarylmethane, triarylmethane, xanthene, acridene, methine, thiazole, indamine, azine, oxazine and anthraquinone dyestuff radicals. Non-migratory static dyes represented by formula IV are described in further detail in U.S. Pat. Nos. 4,284,729; 4,640,690; and 4,812,141.

Non-migratory static dyes have been found to be useful when dyeing plastic articles by means of imbibition or diffusion (e.g., by dipping and/or spraying of a dye composition onto the plastic article). When incorporated into the plastic article by means of imbibition, excess non-migratory static dye can be washed off of the plastic article, with a minimum of imbibed non-migratory static dye being leached from the plastic article. Non-migratory static dyes (e.g., as represented by formula IV) have been found to be particularly useful when dyeing (e.g., by imbibition) plastic articles fabricated from thermoplastic polyurethane.

Photochromic dyes that may be present in the plastic article include those known to the skilled artisan. Classes of suitable photochromic dyes include, but are not limited to: spiro(indoline)naphthoxazines and spiro(indoline)benoxazines (e.g., as described in U.S. Pat. No. 4,818,096); and chromenes, such as benzopyrans and naphthopyrans (e.g., as described in U.S. Pat. No. 5,274,132), and benzopyrans having substituents at the 2-position of the pyran ring and an optionally substituted heterocyclic ring, such as a benzothieno or benzofurano ring fused to the benzene portion of the benzopyran (e.g., as described in U.S. Pat. No. 5,429,774). Further classes of photochromic dyes include, for example organo-metal dithizonates, such as (arylazo)-thioformic arylhydrazidates, e.g., mercury dithizonates (e.g., as described in U.S. Pat. No. 3,361,706); fulgides and fulgimides, such as 3-furyl and 3-thienyl fulgies and fulgimides (e.g., as described in U.S. Pat. No. 4,931,220).

Photochromic dyes or mixtures thereof may be used alone or in combination with one or more static dyes in the plastic article in the method of the present invention. Typically, the imbibition of photochromic dyes into thermoplastic articles, such as thermoplastic polycarbonate articles, results in a dyed plastic article that does not readily change color upon exposure to or shielding from UV light. While not intending to be bound by any theory, it is believed based on the information at hand, that the photochromic dyes become trapped in either an open or closed form within the thermoplastic polymer matrix. The imbibition of photochromic dyes into plastic articles fabricated from thermoset polymers, such as thermoset polycarbonates or thermoset polyurethanes, typically results in the formation of a dyed plastic article having photochromic properties.

The plastic article may be a molded plastic article, which is prepared by art-recognized methods. Molding methods include, for example compression molding, injection molding, rotational molding, extrusion, injection and extrusion blow molding, and casting. The molded plastic article may be selected from shaped articles, films (e.g., having a thickness of less than 30 mils (762 μm)), and sheets (e.g., having a thickness of greater than or equal to 30 mils (762 μm)). Examples of shaped molded articles include, optical lenses, ophthalmic lenses, sunshade lenses and glazings (e.g., windows in transportation vehicles, such as cars, trucks and aircraft, and windows in residential and commercial buildings). Further examples of molded plastic articles include: computer face-plates; keyboards; bezels and cellular phones; color coded packaging and containers of all types, including ones for industrial components; residential and commercial lighting fixtures and components therefor; sheets, e.g., used in building and in construction; tableware, including plates, cups and eating utensils; small appliances and their components; as well as decorative films, including films that are intended for use in film insert molding.

In an embodiment of the present invention, the plastic article is selected from thermoplastic pellets and/or thermoplastic strands. Thermoplastic pellets and strands may be made by art-recognized methods, such as extrusion or melt-spinning. The thermoplastic pellets and/or strands are treated, and then may be further processed. In an embodiment of the present invention, the treated thermoplastic pellets and/or strands are melted (e.g., in an extruder) to form a molten treated thermoplastic composition, and then the molten treated thermoplastic composition is introduced (e.g., injected) into a mold. The contents of the mold are allowed to cool, the mold is opened, and a treated shaped molded article is removed therefrom.

This method of further processing treated thermoplastic pellets and/or strands is favorably differentiated from the direct incorporation methods described previously herein. With treated thermoplastic pellets and/or strands, the performance enhancing additive is already present within the thermoplastic polymer (rather than being added to the polymer separately), which allows for more control and reliability with regard to producing molded articles having a desired and reproducible level of physical properties.

In the method of the present invention the plastic article is contacted with the treatment composition by: (I) dipping at least a portion of the surface of the plastic article into the treatment composition; and/or (II) applying the treatment composition to at least a portion of the surface of the plastic article.

When dipping is employed as the means by which the treatment composition is contacted with the plastic article, the plastic article to be treated (e.g., a lens), is immersed at least partially in the treatment composition for a period of time and at temperature at least sufficient to facilitate at least some impregnation (diffusion or imbibition), of the performance enhancing additive into the surface of the plastic article, thus effecting treatment thereof. The time and temperature employed typically depends on the composition of the plastic article. Thermoset plastic articles are typically more resistant to heat (e.g., having a higher heat distortion temperature) than thermoplastic articles. As such, thermoset plastic articles can typically withstand immersion in treatment baths at higher temperatures than thermoplastic articles.

Immersion times are typically less than or equal to 8 hours, more typically less than or equal to 4 hours, and even more typically less than or equal to 1 hour. Immersion times are also typically at least 5 seconds, more typically at least 15 seconds, and even more typically at least 1 minute. The immersion time may range between any of these upper and lower values, inclusive of the recited values. In an embodiment of the present invention, the immersion time is typically from 5 seconds to 8 hours, more typically from 15 seconds to 4 hours, and further typically from 1 minute to 1 hour (e.g., 1 to 15 minutes).

The treated plastic article is then withdrawn from the treatment composition. Withdrawal of the treated plastic article from the treatment bath may be performed quickly or at a slower rate (e.g., at a rate sufficient to effect a tinting gradient). When forming a dyed plastic article having a treatment gradient, the portion of the article that remains in the treatment bath for a longer period of time is impregnated with more performance enhancing additive, and thus exhibits a greater degree of treatment (relative to those portions which were removed from the bath at an earlier time).

Aside from dipping, or in addition thereto, the treatment composition may be applied to at least a portion of the surface of the plastic article by methods that include, but are not limited to, spray application, curtain application and/or spin application. Spray application methods typically involve placing the plastic article in a spray chamber that includes a plurality of spray nozzles. The treatment composition is passed through the spray nozzles and contacts at least a portion of the surface of the plastic article. Excess treatment composition is typically collected from the base of the spray chamber, filtered and recycled back to the spray nozzles. The treated plastic article is removed from the chamber, and excess treatment composition may be removed therefrom by further spraying with deionized or distilled water, followed by drying.

Curtain application methods are particularly well suited for, though not limited to, the treatment of substantially flat plastic articles, e.g., plastic articles in the form of films or sheets. The plastic article is typically passed through (or under) at least one continually falling curtain of the treatment composition. After passing through the falling curtain of treatment composition, the plastic article is typically rinsed with deionized water and dried.

Spin application methods are suited for, though not limited to, the treatment of substantially flat plastic articles, e.g., plastic articles in the form of flat discs. A measured amount of treatment composition is typically applied to the center of the plastic article, such as a plastic disc, and the plastic article is spun causing the treatment composition to spread over the surface thereof. The treatment composition may be allowed to remain in contact with the surface of the plastic article for a period of time (e.g., 60 seconds), followed by rinsing with deionized or distilled water and drying.

The temperature of the treatment composition when contacted with at least a portion of the surface of the plastic article (e.g., during dipping or application, such as spray application, methods) is typically at least room temperature (e.g., 25° C.) and less than the boiling and/or decomposition temperature of the treatment composition. Typically the treatment composition is maintained at a temperature of 25° C. to 99° C., for example from 60° C. to 97° C. or from 70° C. to 95° C. As described previously herein, the time and temperature of contact with the plastic article will depend at least in part on the type of plastic article that is to be treated. For example, with plastic articles of thermoplastic aromatic polycarbonate, treatment may be efficiently carried out at a temperature of 90 to 99° C., with an contact time of typically less than 1 hour, and more typically in the range of 1 to 15 minutes. In some instances the performance enhancing additive may be more quickly and efficiently imbibed into a softer plastic article, such as a softer thermoplastic article, in which case a lower treatment composition temperature will typically suffice. For example, plastic articles fabricated from thermoplastic polyurethanes, or thermoplastic styrene-acrylonitrile copolymers (SAN's), may be readily treated using the same treatment composition used for treating thermoplastic aromatic polycarbonate, but at temperatures of 70° C. and 80° C. respectively.

The treatment composition may be prepared by mixing the performance additive(s), water, carrier, diol and optional surfactants together in any order. For example the carrier and diol may be mixed together with the performance additives, and then this mixture is either added to water or water is added to it. In an embodiment, the treatment composition is formed by: (i) preparing a mixture of water, carrier and diol; (ii) introducing the performance additive(s) into a filter; and (iii) passing the mixture over the performance additive(s) and through the filter, thereby forming the treatment composition. The treatment composition, or at least a portion thereof, is then typically passed continuously through the filter. Optionally, the mixture of water, carrier and diol may be heated, e.g., heated to a temperature of 25° C. to 99° C., or 60° C. to 97° C., or 70° C. to 95° C., and then the heated mixture is contacted with the performance additive(s) in the filter.

The filter into which the performance additive(s) is added, may be any suitable filter known to the skilled artisan. A preferred type of filter is a bag filter. Preparing and maintaining the treatment composition in this manner, ensures that the level of performance additive in the bath/composition is maintained substantially at a saturation level (as discussed previously herein). In addition, passing the treatment composition continuously through the bag filter serves to remove particulate contaminants therefrom (e.g., unsolubilized performance additive particles), which could foul the treated plastic articles prepared by immersion in the treatment composition.

In a further embodiment, the treatment composition is continuously introduced into and withdrawn from an immersion tank (or vessel). Typically, the immersion tank is part of a circuit which includes an inlet that is in fluid communication (via an inlet conduit) with a pump, which is in fluid communication with an outlet from the tank via an outlet conduit. The circuit may optionally include at least one filter, e.g., a bag filter as described previously herein, located inline with the inlet and/or outlet conduits. Preferably, the inlet and outlet of the immersion tank are positioned below the liquid level of the treatment composition within the tank.

The immersion tank inlet may include a plate having a plurality of perforations (e.g., a diffuser or diffuser plate). Continuously introducing the treatment composition into the immersion tank by passage through a plate having a plurality of perforations increases the level of turbulent mixing within the immersion tank, and improves the efficiency and uniformity of treatment of plastic articles immersed therein. The perforations in the diffuser plate may have any suitable shape, e.g., circular, ellipsoid, polygonal or combinations thereof. The perforations of the diffuser plate typically have diameters of from 0.79 mm to 12.70 mm, e.g., from 3.17 mm to 6.35 mm. The diffuser plate may have any suitable configuration, e.g., it may be flat, concave or convex.

The scope of the method of the present invention is inclusive of additional steps whereby the composition of the treatment composition is modified, e.g., such that an initial performance enhancing additive or additives may be substituted with a subsequent performance enhancing additive or additives. In an embodiment of the present invention, the performance enhancing additives (and optional dye or dyes) are separated from the other components of the treatment composition (e.g., the water, carrier, diol and optional surfactants). Such a separation, is environmentally favorable in that it allows for re-use of the non-additive components of the composition, for example with another performance enhancing additive or additives, or with a fresh performance enhancing additive(s). In addition, the performance enhancing additive separation method may be performed if the performance enhancing additive of the treatment composition has been damaged, for example oxidized or otherwise denatured (e.g., due to over heating due to a temperature spike).

The performance enhancing additive separation process may be performed by contacting the treatment composition with particulate activated carbon, and then isolating a substantially additive-free liquid therefrom containing water, carrier, diol and optional surfactants in substantially the same relative proportions as prior to the separation step. The additive-free liquid may then be mixed with another performance enhancing additive(s) to form a different treatment composition, or used as a rinse composition to rinse treated plastic articles after they have been removed from contact with the treatment composition. The treatment composition may be contacted with the activated carbon by passing the treatment composition continuously through a bed or column containing activated carbon.

The activated carbon typically retains substantially all of the performance enhancing additives of the treatment composition, and preferably less than a minimal amount of the organic liquid components of the treatment composition (e.g., carrier, diol and optional surfactants). However, there may be some evaporation of the organic liquid components, requiring adjustment of the additive-free liquid by means of subsequent additions of the evaporated components.

In an embodiment of the present invention, the method further involves a performance enhancing additive separation process that includes:
(i) contacting the treatment composition with particulate activated carbon to form a mixture of the treatment composition and particulate activated carbon;
(ii) isolating from the mixture a substantially additive-free liquid comprising water, carrier and diol; and
(iii) optionally adding at least one performance enhancing additive to the substantially additive-free liquid, thereby forming a further treatment composition.

As discussed previously herein, the treatment composition may be contacted with the particulate activated carbon by passing the treatment composition through a bed or a column containing the particulate activated carbon. The additive-free liquid that is isolated in the additive separation process is substantially free of performance enhancing additives, e.g., containing an undetectable amount of additive as determined by means of spectrophotometric analysis. The particulate activated carbon typically has a 200 mesh particle size (e.g., a particle size of 0.075 mm). An example of a commercially available particulate activated carbon that may be used in the present invention is Filtrasorb 200 activated carbon from Calgon Carbon Corporation.

The amount of activated carbon that is required to effect performance enhancing additive separation is dependent in part on the temperature of the treatment composition. In general, the amount of activated carbon required to effect additive separation is: reduced as the temperature of the treatment composition is reduced; and increased as the temperature of the treatment composition is increased. In an embodiment of the present invention, the treatment composition is contacted with the activated carbon at a temperature of 25° C.

The performance enhancing additive(s) optionally added to the additive-free liquid may be selected from UV stabilizers, optical brighteners, mold release agents, antistatic agents, thermal stabilizers, IR absorbers and antimicrobial agents. The performance enhancing additives that may be added to the additive-free liquid include those classes and examples described previously herein. The performance enhancing additive added to the additive-free liquid may be of the same type as the additive that was removed from the treatment composition, in which case the further treatment composition is a fresh or refreshed treatment composition. Alternatively, the performance enhancing additive added to the additive-free liquid may be different than the additive that was removed from the treatment composition, in which case the further treatment composition is a new or different treatment composition.

The performance enhancing additive separation process may further include adding additional materials to the additive-free liquid and/or the further additive bath. Such other additional materials include, for example, surfactants and/or dyes, which may each be selected from those classes and examples as described previously herein.

Upon removal from contact with the treatment composition, the treated plastic article is typically rinsed to remove excess performance enhancing additives therefrom. The rinsing step is typically achieved by contacting at least a portion of the surface of the treated plastic article with a rinse composition comprising water, and optionally a carrier (iii) represented by formula I, and/or a diol (iv). The water of the rinse composition may be deionized or distilled water. The carrier and diol that may be present in the rinse composition are as described previously herein with reference to the treatment composition, and may each be selected from those classes and examples as recited previously herein. For example, in an embodiment, the carrier is ethyleneglycol mono-butyl ether, and the diol is diethylene glycol. Preferably, the rinse composition is composed of water, a carrier represented by formula I and a diol (as described previously herein with reference to diol (iv) of the treatment composition).

The rinse composition may be contacted with the surface of the treated plastic article by means of, for example, immersion (dipping), spray application and/or curtain application. After contact with the surface of the treated plastic article, the rinse composition may be recycled and used to rinse additional treated plastic articles. After a number of rinse cycles, performance enhancing additive(s) will typically accumulate in the recycled rinse composition. Accumulated additives may be removed from the recycled rinse composition by contacting the recycled rinse composition with particulate activated carbon, as described previously herein with regard to the performance additive separation process. Upon separating accumulated performance enhancing additives from the recycled rinse composition, the additive-free recycled rinse composition may then be used to rinse additional treated articles.

The rinse composition typically contains water in an amount typically from 50 (or 51) to 100 percent by weight, more typically from 60 to 87 percent by weight, and further typically in an amount of from 65 to 75 percent by weight. The percent weights being based on the total weight of the rinse composition, in each case.

If present, the amounts of carrier and/or diol that may be present in the rinse composition may be selected from those ranges and amounts as recited previously herein with regard to the dye bath. For example, the carrier may be present in the rinse composition in an amount typically from 10 to 30 percent by weight, more typically from 15 to 25 percent by weight, and further typically in an amount of from 17 to 20 percent by weight. The percent weights being based on the total weight of the rinse composition, in each case. The diol may, for example, be present in the rinse composition in an amount of typically from 1 to 20 percent by weight, more typically from 5 to 15 percent by weight, and further typically in an amount of from 10 to 12 percent by weight. The percent weights being based on the total weight of the rinse composition, in each case.

After rinsing, the treated plastic article is typically dried. Drying may be accomplished by wiping the rinsed treated plastic article with a dry cloth, and/or by standing at room temperature (25° C.). Alternatively, the rinsed treated plastic article may be dried by exposure to elevated temperatures (above 25° C.), e.g., at a temperature of from 50° C. to 100° C. In addition, warm air (e.g., having a temperature of 50° C. to 100° C.) may be passed over the surfaces of the rinsed treated plastic article.

In an embodiment of the present invention, a dyed and treated plastic article is prepared. A dyed and treated plastic article may be prepared by contacting a treated plastic article (prepared in accordance with the present invention) with a dye composition comprising at least one dye.

As discussed previously herein, dyed plastic articles may be prepared by incorporating the dye directly into the plastic material from which the plastic article is prepared, and/or contacting at least a portion of the surface of a plastic article with a dye composition. In an embodiment of the present invention, a dyed and treated plastic article is prepared by: contacting at least a portion of the surface of a plastic article with a dye composition comprising at least one dye, thereby forming a dyed plastic article; and then contacting the dyed plastic article with the treatment composition of the present invention.

In an embodiment of the present invention, the dye composition, that is contacted with either the treated plastic article or the untreated plastic article, includes:

(i) at least one dye;
(ii) water;
(iii) at least one carrier represented by the following general formula III,

III wherein $R^1$, $R^2$, n and m are each as described previously herein with regard to formula I; and (iv) a diol selected from at least one of linear or branched $C_2$-$C_{20}$ aliphatic diols, poly($C_2$-$C_4$ alkylene glycol), cycloaliphatic diols having from 5 to 8 carbon atoms in the cyclic ring, monocyclic aromatic diols, bisphenols and hydrogenated bisphenols.

Each of the carrier and diol may be selected independently from those carriers and diols as described previously herein with regard to the treatment composition (e.g., ethylene glycol monobutyl ether, and diethylene glycol). The dye may be selected from static dyes and/or photochromic dyes, as described previously herein. The water of the dye composition is preferably deionized or distilled water. The amounts of water, carrier and diol present in the dye composition may be selected independently from those amounts and ranges as described previously herein with regard to the treatment composition.

Typically the dye is present in the dye bath in an amount of less than or equal to 15 percent by weight, more typically less than or equal to 5 percent by weight, further typically less than equal to 1 percent by weight, and still further typically less than 0.5 percent by weight. The dye is also typically present in the dye bath in an amount of at least 0.001 percent by weight, preferably at least 0.005 percent by weight, and more preferably at least 0.01 percent by weight. The dye may be present in the bath in an amount ranging between any combination of these upper and lower values, inclusive of the values thereof. For example, the dye may be present in the dye bath in an amount typically from 0.001 to 15 percent by weight, more typically from 0.005 to 5 percent by weight, further typically in an amount of from 0.01 to 1 percent by weight, and still further typically in an amount of from 0.01 to 0.5 percent by weight. In an embodiment, the dye is present in the dye bath in an amount of 0.03 percent by weight. The percent weights being based on the total weight of the dye bath, in each case.

The dye composition may be contacted with at least a portion of the surface of the treated or untreated plastic article by: (I) dipping at least a portion of the surface of the plastic article into the dye composition; and/or (II) applying the dye composition to at least a portion of the surface of the plastic article (e.g., by means of spray, curtain or spin application). Contacting of at least a portion of the surface of the plastic article with the dye composition may be conducted in a manner and under conditions similar to those described previously herein with regard to contacting at least a portion of the surface of a plastic article with the treatment composition (including contact times and composition temperatures).

The dyed plastic article is preferably rinsed prior to contact with the treatment composition. After removal from contact with the dye composition, the dyed plastic article is typically rinsed with deionized water to remove excess dye composition therefrom. Optionally, the rinsed dyed plastic article may also be dried prior to contact with the treatment composition.

In an alternative embodiment of the present invention, a dyed and treated plastic article may be prepared by including at least one dye in the treatment composition. The dye included in the treatment composition may be selected from static dyes and/or photochromic dyes, which may each be selected from those classes and examples as recited previously herein. If present in the treatment bath, the dye may be present in an amount selected from those amounts and ranges as recited previously herein with regard to the dye bath alone. The dye may be introduced into the treatment composition in a manner similar to that used when forming the treatment composition, e.g., by adding the dye to a filter through which the liquid components of the composition are passed. By contacting the dye-containing treatment composition with a plastic article, a dyed and treated plastic article may be prepared in accordance with the method of the present invention.

The present invention is more particularly described in the following examples, which are intended to be illustrative only, since numerous modifications and variations therein will be apparent to those skilled in the art. Unless otherwise specified, all parts and percentages are by weight.

EXAMPLES

In the following examples, each treatment composition (bath) was prepared by mixing 18,976 grams of deionized water, 4929 grams of ethyleneglycol mono-butyl ether (as carrier), and 3081 grams of diethylene glycol (as diol) together in a mixing tank, thus forming a liquid mixture having a total weight of 26,986 grams. The liquid mixture was heated to 95° C., and then forwarded continuously through a bag filter into which 50 g of additive had been previously placed. The heated mixture containing the additive was cycled from the mixing tank through the bag filter and back to the mixing tank for a period of time sufficient to saturate the mixture of water, carrier and diol with the additive, and thus form the treatment bath. The treatment bath was recycled back to the mixing tank through small openings (having diameters of 4.8 mm) to enhance turbulent mixing of the treatment bath during treatment operations.

The initial cycling, for purposes of forming a saturated treatment bath, was performed for a period of approximately 60 minutes (including heat-up time). The treatment bath was then continuously cycled through the above described system at a temperature of 95° C., and at a rate of 72 liters/minute.

In the following examples, the amount of additive in the treatment bath was estimated to be a positive amount greater than zero and less than or equal to 0.2 percent by weight, based on the total weight of the treatment bath (as calculated from the known weights of water, carrier, diol and additive used). Typically, a small amount of additive was observed to be present within the bag filter at the completion of each experiment.

Examples 1-4

The treatment compositions of examples 1-4 were prepared as described above. The additive used in each of the treatment compositions of examples 1-4 is described in the following Table 1.

TABLE 1

| | Additive |
|---|---|
| Example 1 | Tinuvin 329 UV-stabilizer, which chemically is described as 2-(2-hyroxy-5'tert-octylpheyl)benzotriazole, was obtained commercially from Ciba Geigy. |
| Example 2 | Tinuvin 326 UV-stabilizer, which chemically is described as 2(3'-tertbutyl-2'-hydroxy-5-methylphenyl-5-chlorobenzotriazole), was obtained commercially from Ciba Geigy. |
| Example 3 | Mixxim ADK LA-31 UV-stabilizer, which chemically is described as bis(2-hydroxy-5-octyl-3)(2,4 benzotriazole-2-yl) phenylmethane, was obtained commercially from Amfine Chemical. |
| Example 4 | Uvitex OB optical brightener, which chemically is described as 2,2'-(2,5-thiophenediyl) bis(5-tertburylbenzoxazole), was obtained commercially from Ciba Geigy. |

Clear test specimens of molded thermoplastic polycarbonate having dimensions of 5 cm×7.5 cm×0.25 cm were immersed in the treatment composition for a period of 3 minutes. The thermoplastic polycarbonate used was MAKROLON 2600 homopolycarbonate, which is based on bisphenol A, having a MFR value of 10 to 12 g/10 minutes (as determined in accordance with ASTM D 1238), and which is available commercially from Bayer Polymers LLC. Upon removal from the treatment composition, the treated plastic articles were rinsed with deionized water, and hand dried with a soft cloth. The treated plastic articles were observed (under an ultraviolet light source) in each case to be free of imperfections or flaws, relative to comparable untreated plastic articles.

The percent transmittance of the treated plastic articles was measured and plotted as a function of wavelength (using a Cary 300 Scan UV-visible Spectrophotometer instrument, commercially available from Varian). The results are represented graphically in FIG. 1. Also included in FIG. 1 is a plot of percent transmittance as a function of wavelength for a comparable polycarbonate specimen that was not treated.

The plots show that plastic articles treated in accordance with the method of the present invention have increased light absorptive properties relative to a comparative plastic article that was not treated. More particularly, the plots show that the method of the present invention results in the imbibition (or diffusion) of additives, such as UV stabilizers and optical brighteners, into a plastic article, such as thermoplastic polycarbonate, and formation of a treated plastic article.

Treatment baths containing water, diol, UV-stabilizer and optical brightener (in the absence of carrier) were observed to result in the formation of substantially untreated thermoplastic polycarbonate articles (as determined by visual inspection of the dipped polycarbonate specimen under a UV-light source). Treatment baths containing water, carrier, UV-stabilizer and optical brightener (in the absence of diol) were observed to result in the formation of thermoplastic polycarbonate articles that were not uniformly treated (as determined by visual inspection of the dipped polycarbonate specimen under a UV-light source).

The present invention has been described with reference to specific details of particular embodiments thereof. It is not intended that such details be regarded as limitations upon the scope of the invention except insofar as and to the extent that they are included in the accompanying claims.

What is claimed is:

1. A method of treating a plastic article comprising:
   (a) providing a plastic article comprising at least one polymer selected from thermoplastic polymer and thermoset polymer;
   (b) contacting at least a portion of the surface of said plastic article with a treatment composition consisting of,
      (i) at least one additive selected from UV stabilizers, optical brighteners, mold release agents, antistatic agents, thermal stabilizers and antimicrobial agents,
      (ii) water,
      (iii) at least one carrier represented by the following general formula I,

wherein $R^1$ is a radical selected from the group consisting of linear or branched $C_1$-$C_{18}$ alkyl, benzyl, benzoyl and phenyl,
      $R^2$ is a radical selected from the group consisting of linear or branched $C_1$-$C_{18}$ alkyl, benzyl, benzoyl, phenyl and H,
      n is 2, 3 or 4, and
      m is 1 to 35, and
      (iv) a diol selected from at least one of linear or branched $C_2$-$C_{20}$ aliphatic diols, poly($C_2$-$C_4$ alkylene glycol), cycloaliphatic diols having from 5 to 8 carbon atoms in the cyclic ring, monocyclic aromatic diols, bisphenols and hydrogenated bisphenols;
   (c) maintaining said portion of said plastic article in contact with said treatment composition for a period of time at least sufficient to form a treated plastic article;
   (d) removing said treated plastic article from contact with said treatment composition said water present in the treatment composition in an amount of 50 to 85 percent, said carrier present in the treatment composition in an amount of 10 to 30 percent and said diol present in the treatment composition in an amount of 5 to 20 percent, said percent all occurrences relative to the weight of the treatment composition; and
   (e) contacting said treated plastic article with a dye composition comprising at least one dye, thereby forming a treated and dyed plastic article.

2. The method of claim 1 wherein said treatment composition is maintained at a temperature of 25 to 99° C.

3. The method of claim 1 wherein said plastic article is contacted with said treatment composition by at least one of:
(I) dipping at least a portion of the surface of said plastic article into said treatment composition; and
(II) applying said treatment composition to at least a portion of the surface of said plastic article.

4. The method of claim 3 wherein said treatment composition is applied to at least a portion of the surface of said plastic article by at least one of spray application, curtain application and spin application.

5. The method of claim 1 wherein said plastic article comprises a polymer selected from at least one of (co)polyesters, (co)polycarbonates, polyesterpolycarbonate copolymers, acrylonitrile-butadiene-styrene copolymers, polyamides, polyurethanes, polyalkyl(meth)acrylate and styrene copolymers.

6. The method of claim 1 wherein $R^1$ is selected from linear or branched $C_1$-$C_{18}$ alkyl, $R^2$ is selected from linear or branched $C_1$-$C_{18}$ alkyl and H, and n is 2.

7. The method of claim 6 wherein $R^1$ is selected from n-butyl, i-butyl and t-butyl, and $R^2$ is selected from n-butyl, i-butyl, t-butyl and H.

8. The method of claim 1 wherein said treatment composition further comprises a surfactant that is different than said carrier, said surfactant being selected from at least one of: anionic surfactants; amphoteric surfactants; and a non-ionic surfactant selected from at least one poly($C_2$-$C_4$ alkoxylated) $C_{14}$-$C_{18}$ unsaturated fatty acid.

9. The method of claim 8 wherein said surfactant is present in an amount of from 1 to 15 percent by weight, based on the total weight of said treatment composition.

10. The method of claim 1 wherein said diol is a poly($C_2$-$C_4$ alkylene glycol) selected from diethylene glycol, triethylene glycol, tetraethylene glycol, pentaethylene glycol and mixtures thereof.

11. The method of claim 10 wherein said diol is diethylene glycol.

12. The method of claim 10 wherein $R^1$ is selected from linear or branched $C_1$-$C_{18}$ alkyl, $R^2$ is H, n is 2 and m is 1.

13. The method of claim 12 wherein $R^1$ is selected from n-butyl, i-butyl and t-butyl.

14. The method of claim 1 wherein said plastic article comprises at least one of static dyes, photochromic dyes, pigments, crosslinked polymethylmethacrylate microspheres, glass microspheres and metal flakes.

15. The method of claim 1 wherein said plastic article comprises a thermoplastic polycarbonate selected from at least one of thermoplastic aromatic polycarbonates and thermoplastic aliphatic polycarbonates.

16. The method of claim 1 wherein said plastic article is a molded article comprising a thermoset polycarbonate.

17. The method of claim 16 wherein said thermoset polycarbonate is a polymerizate of a polymerizable composition comprising polyol(ally carbonate) monomers.

18. The method of claim 1 wherein said plastic article is a molded article selected from shaped articles, films and sheets.

19. The method of claim 18 wherein said molded article is a shaped article selected from optical lenses, ophthalmic lenses, sunshade lenses and glazings.

20. The method of claim 1 wherein said plastic article is selected from thermoplastic pellets and thermoplastic strands.

21. The method of claim 20 further comprising, melting at least one of said treated thermoplastic pellets and said treated thermoplastic strands to form a treated molten thermoplastic composition, and introducing said treated molten thermoplastic composition into a mold, thereby forming a treated shaped molded article.

22. The method of claim 1 further comprising, introducing continuously said treatment composition into an immersion tank through a plate having a plurality of perforations.

23. The method of claim 1 further comprising contacting at least a portion of the surface of the treated plastic article removed from contact with said treatment composition with a rinse composition comprising water, and optionally at least one of said carrier (iii) and said diol (iv).

24. A method of treating a plastic article comprising:
(a) providing a plastic article comprising at least one polymer selected from thermoplastic polymer and thermoset polymer:
(b) contacting at least a portion of the surface of said plastic article with a treatment composition consisting of,
(i) at least one additive selected from UV stabilizers, optical brighteners, mold release agents, antistatic agents, thermal stabilizers and antimicrobial agents,
(ii) water,
(iii) at least one carrier represented by the following general formula I,

wherein $R^1$ is a radical selected from the group consisting of linear or branched $C_1$-$C_{18}$ alkyl, benzyl, benzoyl and phenyl,
$R^2$ is a radical selected from the group consisting of linear or branched $C_1$-$C_{18}$ alkyl, benzyl, benzoyl, phenyl and H,
n is 2, 3 or 4, and
m is 1 to 35, and
(iv) a diol selected from at least one of linear or branched $C_2$-$C_{20}$, aliphatic diols, poly($C_2$-$C_4$ alkylene glycol), cycloaliphatic diols having from 5 to 8 carbon atoms in the cyclic ring. monocyclic aromatic diols, bisphenols and hydrogenated bisphenols;
(c) maintaining said portion of said plastic article in contact with said treatment composition for a period of time at least sufficient to form a treated plastic article;
(d) removing said treated plastic article from contact with said treatment composition said water present in the treatment composition in an amount of 50 to 85 percent, said carrier present in the treatment composition in an amount of 10 to 30 percent and said diol present in the treatment composition in an amount of 5 to 20 percent, said percent all occurrences relative to the weight of the treatment composition;
(e) contacting said treatment composition with particulate activated carbon to form a mixture of said treatment composition and particulate activated carbon;
(f) isolating from said mixture a substantially additive-free liquid comprising water, said carrier and said diol; and
(g) optionally adding at least one additive to said substantially additive-free liquid, thereby forming a further treatment composition.

25. A method of treating a plastic article comprising:
(a) providing a plastic article comprising at least one polymer selected from thermoplastic polymer and thermoset polymer;
(b) contacting at least a portion of the surface of said plastic article with a treatment composition consisting of, (i) at least one additive selected from UV stabilizers, optical brighteners, mold release agents, antistatic agents, thermal stabilizers and antimicrobial agents,
(ii) water,
(iii) at least one carrier represented by the following general formula I,

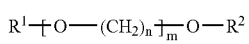

wherein $R^1$ is a radical selected from the group consisting of linear or branched $C_1$-$C_{18}$ alkyl, benzyl, benzoyl and phenyl,
$R^2$ is a radical selected from the group consisting of linear or branched $C_1$-$C_{18}$ alkyl, benzyl, benzoyl, phenyl and H,
n is 2, 3 or 4, and
m is 1 to 35, and
(iv) a diol selected from at least one of linear or branched $C_2$-$C_{20}$ aliphatic diols, Poly($C_2$-$C_4$ alkylene glycol), cycloaliphatic diols having from 5 to 8 carbon atoms in the cyclic ring, monocyclic aromatic diols, bisphenols and hydrogenated bisphenols;
(c) maintaining said portion of said plastic article in contact with said treatment composition for a period of time at least sufficient to form a treated plastic article;
(d) removing said treated plastic article from contact with said treatment composition said water present in the treatment composition in an amount of 50 to 85 percent, said carrier present in the treatment composition in an amount of 10 to 30 percent and said diol present in the treatment composition in an amount of 5 to 20 percent, said percent all occurrences relative to the weight of the treatment composition: and
(e) forming said treatment composition by,
(i) preparing a mixture of water, said carrier and said diol,
(ii) introducing said additive into a filter, and
(iii) passing said mixture over said additive and through said filter, thereby forming said treatment composition; and passing continuously said treatment composition through said filter.

\* \* \* \* \*